(12) United States Patent
Sakai et al.

(10) Patent No.: US 7,641,376 B2
(45) Date of Patent: Jan. 5, 2010

(54) SURFACE LIGHT SOURCE DEVICE AND DISPLAY DEVICE USING SAME

(75) Inventors: Seiji Sakai, Tokyo (JP); Akihiro Mori, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/561,603

(22) Filed: Nov. 20, 2006

(65) Prior Publication Data

US 2007/0147074 A1  Jun. 28, 2007

(30) Foreign Application Priority Data

Dec. 28, 2005 (JP) ............... 2005-376933

(51) Int. Cl.
*F21V 7/04* (2006.01)
(52) U.S. Cl. ............. 362/623; 362/609; 362/613; 362/621; 362/633
(58) Field of Classification Search ........... 362/608, 362/609, 610, 612, 613, 621, 623, 624, 625, 362/628, 632, 633, 634, 617
See application file for complete search history.

(56) References Cited

U.S. PATENT DOCUMENTS

| | | | | |
|---|---|---|---|---|
| 7,139,048 B2 * | 11/2006 | Han et al. | .......... | 362/612 |
| 7,172,327 B2 * | 2/2007 | Kuo | .......... | 362/609 |
| 7,350,957 B2 * | 4/2008 | Liao | .......... | 362/621 |
| 2006/0221641 A1 * | 10/2006 | Yoon et al. | .......... | 362/623 |
| 2007/0008739 A1 * | 1/2007 | Kim et al. | .......... | 362/612 |

FOREIGN PATENT DOCUMENTS

| | | |
|---|---|---|
| JP | 5-307365 | 11/1993 |
| JP | 6-082601 | 11/1994 |
| JP | 10-308113 | 11/1998 |
| JP | 2001-14922 | 1/2001 |
| JP | 2002-093232 | 3/2002 |
| JP | 2004-022245 | 1/2004 |

OTHER PUBLICATIONS

U.S. Appl. No. 11/940,562, filed Nov. 15, 2007, Mori.
U.S. Appl. No. 11/609,488, filed Dec. 12, 2006, Sakai et al.

* cited by examiner

*Primary Examiner*—Y My Quach Lee
(74) *Attorney, Agent, or Firm*—Oblon, Spivak, McClelland, Maier & Neustadt, L.L.P.

(57) ABSTRACT

The present invention provides a surface light source device capable of reducing luminance non-uniformity near point light sources and near between the point light sources adjacent to each other, and a display device of high display quality. The surface light source device includes: a plurality of LEDs arranged at a predetermined spacing; a light guide plate that emits, as a surface light, light emitted from the point light sources and entered into at least one side surface, through a light emission surface perpendicular to a light incident surface; reflecting sheets disposed respectively on a light anti-emission surface and near the LEDs in the light guide plate; and a casing having an opening part at a location corresponding to the light emission surface of the light guide plate, and holding the LEDs and the light guide plate and the reflecting sheets. The surface light source device further includes, near between the LEDs adjacent to each other, light introducing means for introducing the light emitted from the LEDs into the light emission surface or the light anti-emission surface.

22 Claims, 10 Drawing Sheets

SURFACE LIGHT SOURCE DEVICE AND DISPLAY DEVICE USING SAME

BACKGROUND OF THE INVENTION

1. Field of the Invention

The present invention relates to a surface light source device and a display device using the same, and more particularly, to a surface light source device using a point light source and a display device using the same.

2. Description of the Background Art

Liquid crystal display devices, signboards, guide lights and the like are not spontaneous emissive display devices whose display part itself emits light. It is required for these non-spontaneous emissive display devices to have a surface light source device such as a backlight on the back face of the display part.

In a conventional surface light source device, a linear light source such as a cold cathode fluorescent tube, or a point light source such as a light emitting diode has been used as a light source disposed on a side surface of a light guide plate. When using the point light source, however, the light source is formed by arranging a plurality of light emitting diodes or the like in a row on the side surface of the light guide plate, and hence there may arise luminance non-uniformity between the region of the point light source, and the region near between the adjacent point light sources.

Japanese Patent Application Laid-Open No. 2001-14922 discloses a surface light source device. Specifically, to diminish the luminance non-uniformity of the light emitted from an opening part, concaves and convexes are provided on the whole of a light incident surface of a light guide plate, and light emitting diodes are fit into the concave portions. Further, reflecting members are disposed at the convex portions of the light incident surface of the light guide plate.

Nevertheless, even with the surface light source device employing the construction of the above-mentioned publication, the luminance is slightly higher in the region near point light source than the region near between adjacent point light sources because the point light sources are arranged discretely. The luminance difference may deteriorate the display quality in this surface light source device.

SUMMARY OF THE INVENTION

It is an object of the present invention to provide a surface light source device capable of diminishing luminance non-uniformity between the region near a point light source and the region near between adjacent point light sources, as well as a display device of high display quality.

According to one aspect of the present invention, the surface light source device includes: a plurality of point light sources; a light guide plate; reflecting parts; and a casing. The point light sources are arranged at a predetermined spacing. The light guide plate emits, as a surface light, light emitted from the point light sources and entered into at least one side surface, through a light emission surface located perpendicularly to the side surface. The reflecting parts are disposed respectively at a light anti-emission surface of the light guide plate and at near the point light sources. The casing has an opening part at a position corresponding to the light emission surface of the light guide plate, and holds the point light sources, the light guide plate, and the reflecting parts. The surface light source further includes, near between the point light sources adjacent to each other, light introducing means for introducing the light emitted from the point light sources into the light emission surface or the light anti-emission surface of the light guide plate.

This surface light source device is capable of diminishing luminance non-uniformity near the point light sources and near between the point light sources adjacent to each other by disposing the light introducing means for introducing the light emitted from the point light sources into the light emission surface or the light anti-emission surface of the light guide plate, near between the point light sources adjacent to each other.

According to a second aspect of the present invention, the surface light source device includes: a plurality of point light sources; a light guide plate; reflecting parts; and a casing. The point light sources are arranged at a predetermined spacing. The light guide plate emits, as a surface light, light emitted from the point light sources and entered into at least one side surface, through a light emission surface located perpendicularly to the side surface. The reflecting parts are disposed respectively at a light anti-emission surface of the light guide plate and at near the point light sources. The casing has an opening part at a position corresponding to the light emission surface of the light guide plate, and holds the point light sources, the light guide plate, and the reflecting parts. The surface light source further includes light introducing means for forming an incident angle different from the incident angle of light directly entering into the side surface, disposed on the side surface of the light guide plate located near between the point light sources adjacent to each other.

This surface light source device enables the uniformity of luminance distribution to be improved by having luminance continuously increase near the light incident surface of the light guide plate by disposing the light introducing means for forming an incident angle different from the incident angle of light directly entering into the side surface, on the side surface of the light guide plate located near between the point light sources adjacent to each other.

These and other objects, features aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
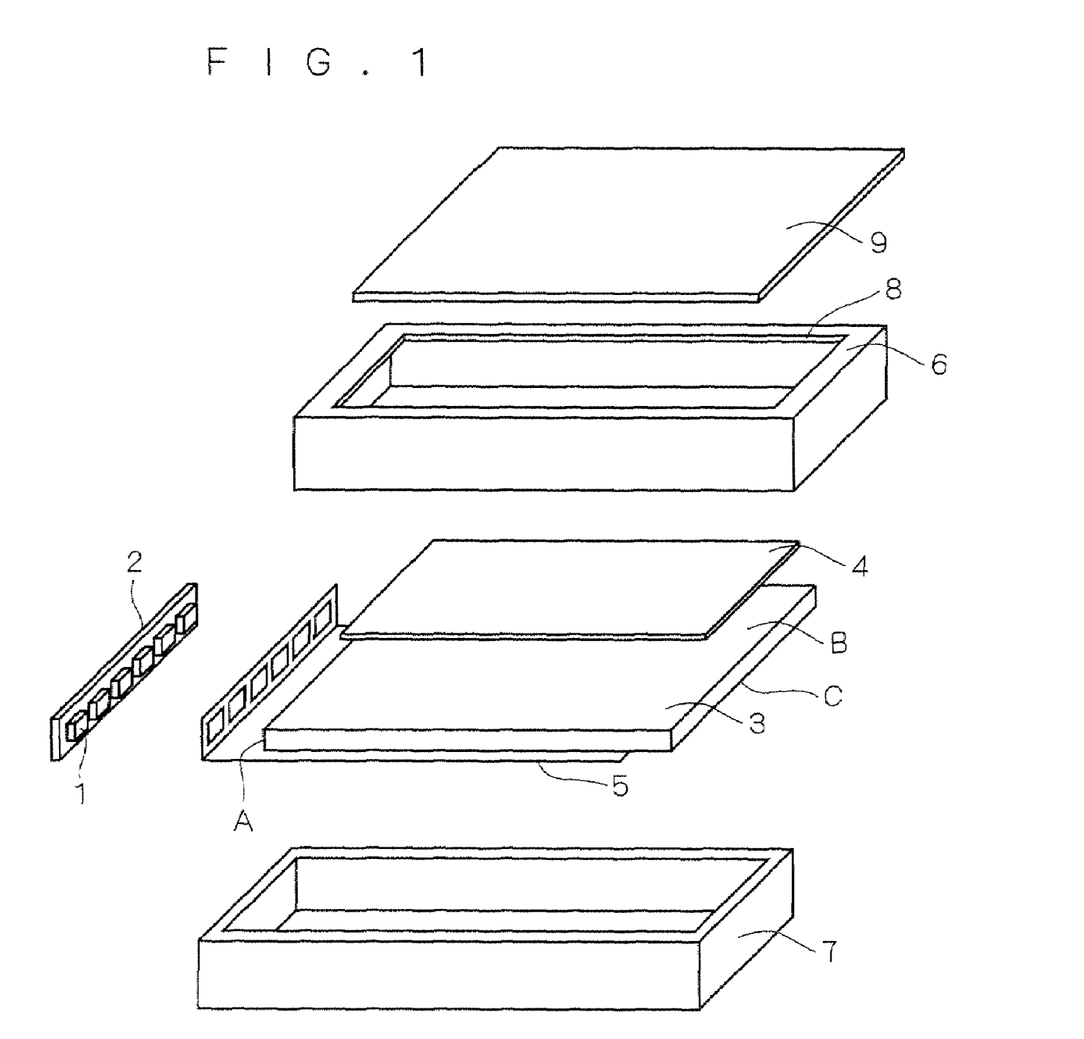
FIG. 1 is an exploded perspective view of a surface light source device according to a first preferred embodiment of the present invention.
Figure 2:
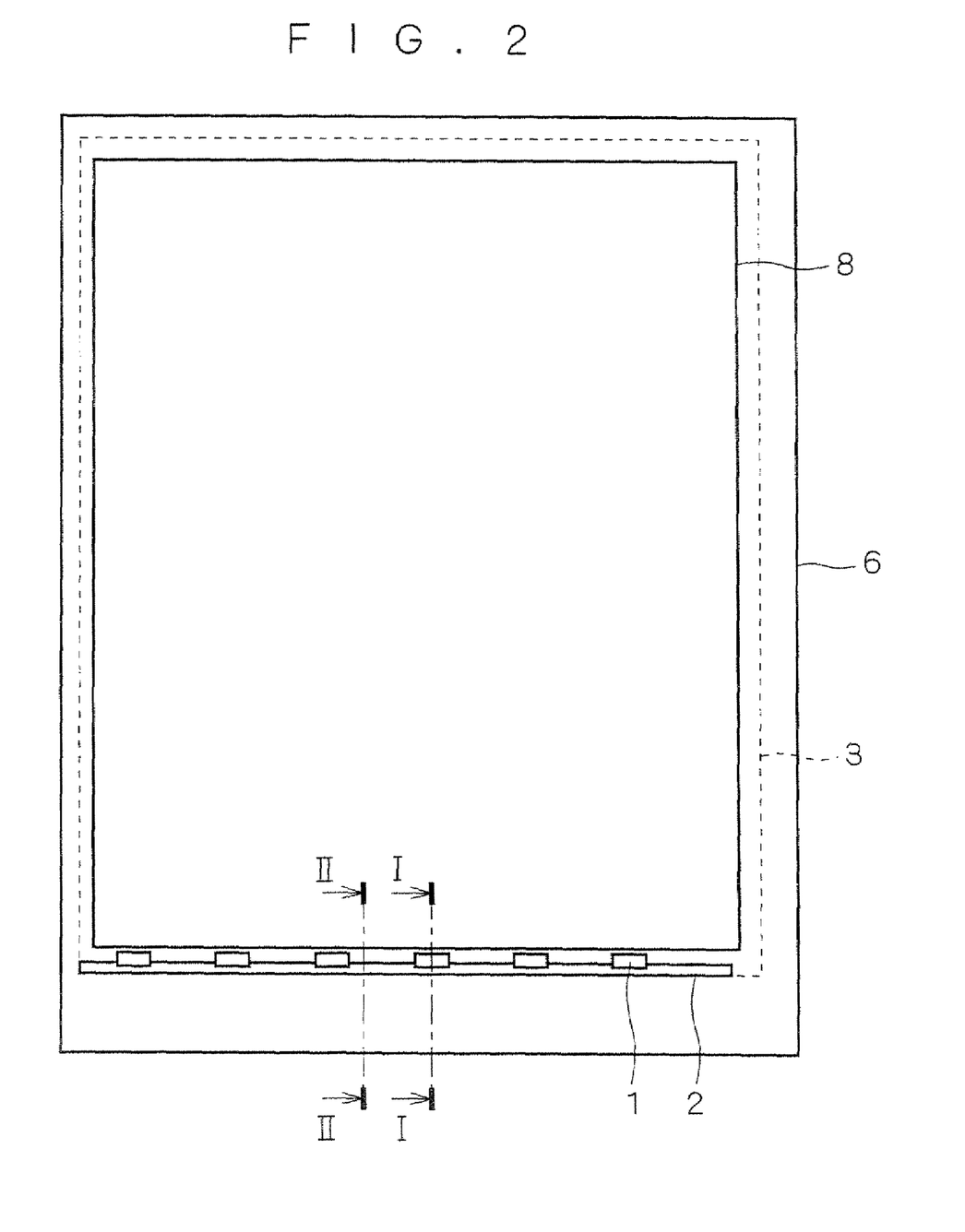
FIG. 2 is a plan view of the surface light source device of the first preferred embodiment.

FIG. 1 is an exploded perspective view of a surface light source device according to a first preferred embodiment. FIG. 2 is a plan view of the surface light source device. In the surface light source device as shown in FIG. 1, a plurality of light emitting diodes (hereinafter referred to also as "LEDs") 1 are arranged in a row and connected to an LED substrate 2. The LEDs 1 are arranged near one side surface located on a shorter side of a light guide plate 3 (hereinafter, a side surface into which the light emitted from a light source enters is referred to as a "light incident surface A"), and the light of the LEDs 1 entered from the light incident surface A is then emitted from a light emission surface B of the light guide plate 3.

Optical sheets 4 are disposed on the light emission surface B side of the light guide plate 3, and a reflecting sheet 5 is disposed on a light anti-emission surface C side of the light guide plate 3. The reflecting sheet 5 is also disposed on the light incident surface A side, and a part of the reflecting sheet 5 which corresponds to the LEDs 1 is removed. In the surface light source device as shown in FIG. 1, the LEDs 1 is removed. In the surface light source device as shown in FIG. 1, the LEDs 1, the LED substrate 2, the light guide plate 3, the optical sheets 4, and the reflecting sheets 5 are interposed and held between an upper casing 6 and a lower casing 7. The upper casing 6 has an opening part 8, and the opening part 8 corresponds to the light emission surface B of the light guide plate 3. Thus, a surface light can be emitted from the opening part 8 in the surface light source device. As will be seen in the plan view of FIG. 2, the opening part 8 is designed so as to lie above a center portion of the light guide plate 3.

FIG. 1 illustrates a liquid crystal display device with a liquid crystal display part 9 disposed on the surface light source device by way of example and without limitations. For example, a display part that displays image by using the light of the surface light source device (e.g., a signboard or a guide light) may be replaced with the liquid crystal display part 9. In the following description of the first preferred embodiment, the surface light source device used in a liquid crystal display device will be discussed.

As a light source used in the first preferred embodiment, there are point light sources such as laser diodes, as well as the LEDs 1. In particular, semiconductor light emitting diodes emitting a monochrome such as blue, or quasi-white LEDs each constructed of a fluorescent substance that emits yellow light by absorbing part of the blue light emitted from a semiconductor light emitting diode may be used as the LEDs 1. In some cases, LEDs having diodes of red, green, and blue, and generating white light by a synthetic light of three monochromatic lights may be used as the LEDs 1. In the first preferred embodiment, the quasi-white LEDs are used as the LEDs 1.

Referring to FIG. 1, the LEDs 1 are mounted on the LED substrate 2 at a predetermined spacing. The LED substrate 2 with the LEDs 1 mounted thereon is arranged so as to oppose to the light incident surface A of the light guide plate 3. Although FIG. 1 shows the case where the LEDs 1 and the LED substrate 2 are disposed only on one side surface of the light guide plate 3 by way of example and without limitations, the LEDs 1 and the LED substrate 2 may be disposed on two or more side surfaces of the light guide plate 3 in the present invention.

The LED substrate 2 holds the LEDs 1, and a circuit pattern for supplying electric power to the LEDs 1 is configured on the LED substrate 2. The use of a metal core substrate as the LED substrate 2 enables the heat released from the mounted LEDs 1 to be transmitted efficiently to the surroundings. By using an FPC (flexible printing circuit) having a small thickness as the LED substrate 2, and mounting the LEDs 1 on the FPC, the heat released from the LEDs 1 can be transmitted more efficiently to the surroundings. The use of the FPC as the LED substrate 2 also has the effect of reducing the external shape size of the surface light source device.

The light guide plate 3 is constructed of transparent acrylic resin, polycarbonate, glass, and the like. The light anti-emission surface C of the light guide plate 3 is provided with a light scattering part (not shown) that disturbs the propagation direction of light so as to introduce the light into the light emission surface B. The light scattering part functions as means for reflecting light toward the inside of the light guide plate 3. Examples of the reflecting means are (i) printing a dot pattern on the light anti-emission surface C, (ii) roughening the light anti-emission surface C, and (iii) forming, on the light anti-emission surface C, convexes and concaves to change the propagation direction of light, such as a micro spherical surface and a prism.

A similar effect is obtainable when the light emission surface B is subjected to satin finish in order to form convexes and concaves thereon, instead of disposing the light scattering part on the light anti-emission surface C of the light guide plate 3. That is, the convexes and concaves on the light emission surface B of the light guide plate 3 scatter the propagation direction of the light emitted from the light emission surface B. As a result, some of the light emitted from the light emission surface B is reflected toward the inside of the light guide plate 3, and the rest is emitted from the light emission surface B to the outside of the light guide plate 3.

Therefore, only the light emission surface B of the light guide plate 3 may be subjected to satin finish, with reflecting means omitted on other surfaces. The satin finish applied to the light emission surface B has the same effect as, for example, the dot pattern printing applied to the light anti-emission surface C, thereby functioning as the reflecting means.

The optical sheets 4 consisting of a plurality of optical sheets are arranged on the light guide plate 3. Specifically, the optical sheets 4 can be constructed by sandwiching a lens sheet between diffusion sheets. In order to improve the luminance of the surface light source device, in consideration of the direction of a prism formed on the surface of the lens sheet, a plurality of lens sheets may be combined together. Alternatively, the diffusion sheet may be used in combination of two or more, in order to improve diffusibility.

Further, depending on the light distribution characteristic of the lens sheet, the number of the lens sheet 1 may be one or zero for the optical sheets 4. Alternatively, the optical sheets 4 may be constructed by combining a protective sheet, a lens sheet, or a polarization reflecting sheet. Preferably, the use of the optical sheets 4 is optimized in view of the desired luminance and light distribution characteristic, and the like.

The reflecting sheet 5 is formed by material obtained by mixing barium sulfate or titanium oxide into PP (polypropylene) or PET (polyethylene terephthalate). Alternatively, the material of the reflecting sheet 5 may be obtained by forming fine air bubbles in resin, or depositing silver on a metallic plate, or applying coating containing titanium oxide and the like to a metallic plate. Preferably, the reflecting sheet 5 has a reflectance of 90% or more. For this, a plurality of the reflecting sheets 5 may be stacked one upon another to increase the reflectance. Increasing the reflectance of the reflecting sheet 5 increases the luminance of the opening part 8.

The luminance characteristic in the light emission surface B of the light guide plate 3 can be improved by applying a dot pattern printing on the light emission surface side or the light anti-emission surface side of the reflecting sheet 5. Further, applying a color printing over the reflecting sheet 5 cancels a color change on the light emission surface B, which can be caused by the light absorption of the light guide plate 3, or the light absorption of the reflecting sheet 5. The influence on the light emission surface B can be slowed down by applying printing on the light anti-emission surface side of the reflecting sheet 5, thus permitting correction of subtle luminance non-uniformity and subtle color non-uniformity on the light emission surface B.

In the first preferred embodiment, as shown in FIG. 1, the reflecting sheet 5 is arranged on the light anti-emission surface C side of the light guide plate 3, and it extends to the side surface (the light incident surface A) of the light guide plate 3 on the LEDs 1 side. The reflecting sheet 5 is arranged in parallel with the LED substrate 2, so as not overlie the area of the LEDs 1. The arrangement of the reflecting sheet 5 on the side surface of the light guide plate 3 enables the light emitted from the side surface of the light guide plate 3 to reenter into the light guide plate 3. This permits efficient use of the light, allowing for an improvement in the luminance on the light emission surface B. Although not shown in FIG. 1, the arrangement of the reflecting sheet 5 on any side surface other than the light incident surface A also enables the light emitted from the side surface to return to the light guide plate 3, thereby increasing the luminance on the light emission surface B.

The upper casing 6 has the opening part 8 allowing the light to be emitted therefrom, and is constructed so as to minimize light leakage from parts other than the opening part 8 into the outside. The inside of the upper casing 6 (the side on which the light guide plate 3 and the like are held) also functions as a reflector causing part of the light emitted from the LEDs 1 to be reflected from the light guide plate 3. Hence, a suitable material of the upper casing 6 is a resin material obtained by mixing titanium oxide into PC (polycarbonate) or ABS (acrylonitrile butadiene styrene).

Alternatively, the upper casing 6 may be constructed of material obtained by applying coating containing titanium oxide and the like to a resin material. That is, the suitable material of the upper casing 6 has a reflectance of 90% or more, and is not subjected to variations in reflectance and reflectance characteristic due to optical deterioration, thermal deterioration, and deterioration with time. Alternatively, the material of the upper casing 6 may be a metallic material such as aluminium or stainless steel, or material obtained by applying coating to a metallic material.

The lower casing 7 functions to support the LED substrate 2, the light guide plate 3, and the reflecting sheet 5 at their respective predetermined positions, and transmit and release the heat released from the LEDs 1 to the surroundings. It is therefore preferable that the lower casing 7 is a metallic casing of high strength and high thermal conductivity. Especially, the use of an aluminium casing having a high thermal conductivity as the lower casing 7 enables the heat released from the LEDs 1 to be efficiently diffused to the casing, enabling the temperature of the LEDs 1 to be lowered.

In the surface light source device as shown in FIG. 1, the liquid crystal display part 9 is placed on the opening part 8. That is, the liquid crystal display part 9 overlies the light emission surface B of the light guide plate 3 serving as the surface light source device, with the optical sheets 4 interposed therebetween. The liquid crystal display device 9 disposed above the surface light source device is a display part to which the double refraction property of liquid crystal is applied. As described above, the display part provided on the surface light source device may be a signboard in which literatures and a picture are printed on a transparent plate.

The liquid crystal display part 9 has an opposed substrate, namely a substrate on which a colored layer, a shielding layer, and opposed electrodes are formed, and a TFT array substrate (not shown), namely a substrate on which a thin film transistor (hereinafter referred to also as "TFT"), and pixel electrodes are formed. The liquid crystal display part 9 consists of a spacer for holding the space between the opposed substrate and the TFT array substrate; a seal material for laminating the opposed substrate and the TFT array crystal; liquid crystal interposed and held between the opposed substrate and the TFT array substrate; an end-sealing material for a filler hole through which the liquid crystal is filled; an alignment layer for aligning the crystal liquid; and a polarizer (not shown). Since the liquid crystal display part 9 used in this invention is an existing one, its detail description is omitted herein. The display device is provided with a printed circuit (not shown) that drives the liquid crystal display part 9.

The following is an optical path on which the light emitted from the LEDs 1 is emitted from the light emission surface B of the light guide plate 3. The light emitted from the LEDs 1 enters directly, or is reflected from the upper casing 6 and the reflecting sheet 5 and then enters, into the light incident surface A of the light guide plate 3.

The light entered into the light guide plate 3 from the light incident surface A propagates in the inside of the light guide plate 3, while repeating total reflection at the boundary between the light guide plate 3 and an air layer. The light propagating in the inside of the light guide plate 3 is subjected to diffuse reflection by the dot pattern printing (not shown) applied to the light anti-emission surface C of the light guide plate 3. By changing the light propagation direction on the light anti-emission surface C of the light guide plate 3, the light having an incident angle not satisfying the critical angle with respect to the boundary between the light guide plate 3 and the air layer can be emitted from the light emission surface B of the light guide plate 3. The light emitted from the light emission surface B is then introduced from the opening part 8 via the optical sheets 4 to the liquid crystal display part 9.

Although some of the light may be emitted from a surface other than the light emission surface B of the light guide plate 3, this light is then reflected from the light anti-emission surface C, the light incident surface A, and the reflecting sheet 5 provided on the side surface in the light guide plate 3, so that this light can reenter into the light guide plate 3 and then be emitted from the light emission surface B of the light guide plate 3.

Although in the first preferred embodiment, the light guide plate 3 is in the shape of a plate, as shown in FIG. 1, the present invention imposes no special limitations upon the shape of the light guide plate 3. For example, the light guide plate 3 may be in the shape of a wedge whose thickness decreases with increasing distance to the LEDs 1. Forming the light guide plate 3 in the shape of the wedge permits efficient propagation of the incident light, enabling this light to be efficiently introduced into the light emission surface B. Additionally, the wedge-shaped light guide plate 3 permits a reduction in the amount of light reflected from the reflecting sheet 5 disposed on the side surface thereof, so that the reflection loss in the reflecting sheet 5 can be reduced thereby to increase the amount of light emitted from the light emission surface B.

Figure 3:
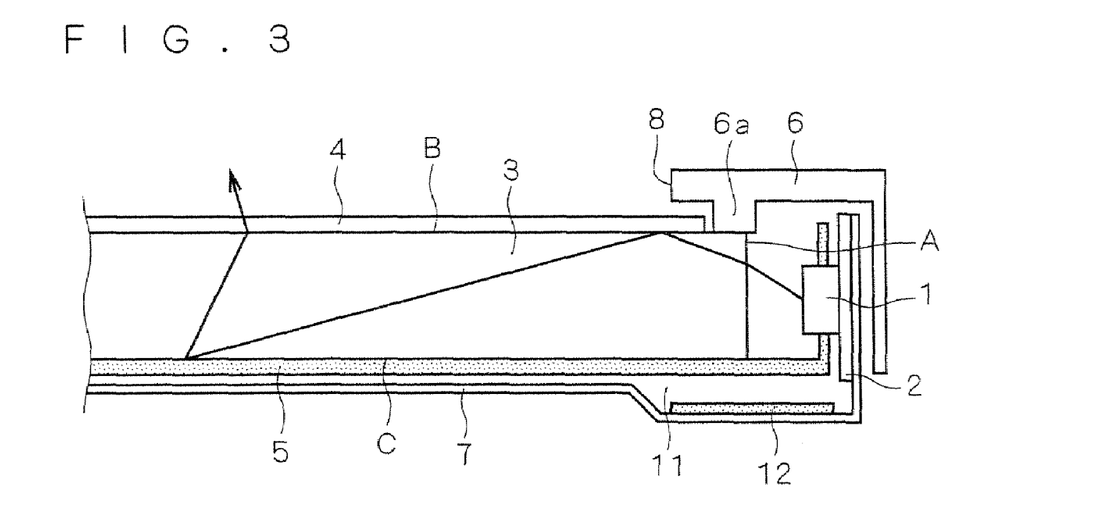
FIG. 3 is a cross section of a region near LEDs in the surface light source device of the first preferred embodiment.
Figure 4:
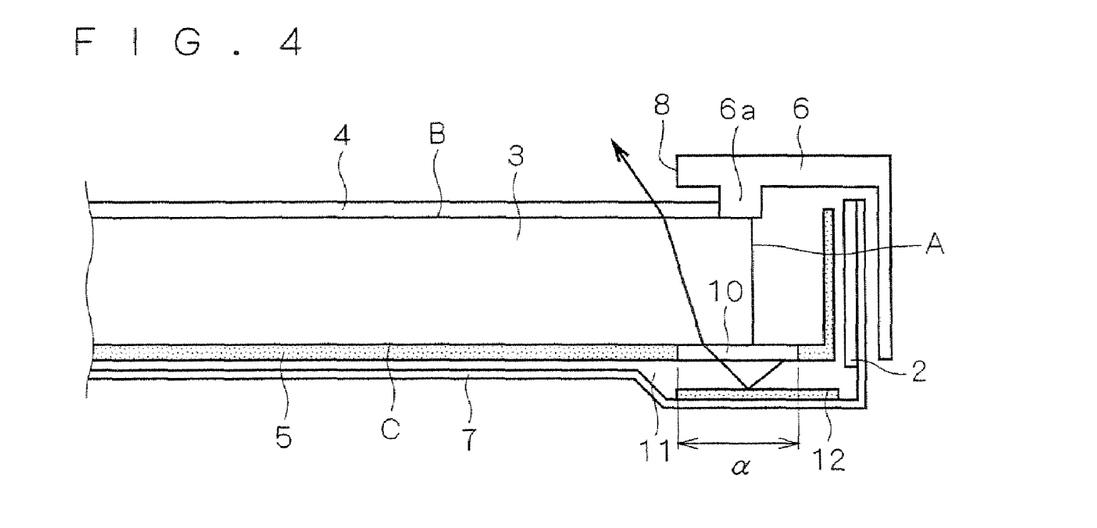
FIG. 4 is a cross section of a region near between adjacent LEDs of the surface light source device of the first preferred embodiment.

An optical path near the LEDs 1 and an optical path near between the adjacent LEDs 1 in the surface light source device of the first preferred embodiment will next be described. FIG. 3 is a cross section in a region near the LEDs 1, taken along the surface I-I in the surface light source device in FIG. 2. FIG. 4 is a cross section in a region near between the adjacent LEDs 1, taken along the surface II-II in the surface light source device in FIG. 2.

First, the following is the construction and the optical path in the region near the LEDs 1 as shown in FIG. 3. Referring to FIG. 3, the end of the light emission surface B of the light guide plate 3 is supported by a convex portion 6a of the upper casing 6. The convex portion 6a extends to the LEDs 1 side. This avoids that, even if the position of the light guide plate 3 is shifted to the LEDs 1 side due to impact or the like, the light emission surface B of the light guide plate 3 is not exposed to the inside of the upper casing 6 (namely, the space surrounded by the upper casing 6, the light guide plate 3 the LEDs 1, and the reflecting sheet 5). Consequently, the light emitted from the LEDs 1 will not directly enter into the light emission surface B of the light guide plate 3.

On the light anti-emission surface C side of the light guide plate 3, the reflecting sheet 5 is arranged so as to extend to the LEDs 1 side, as shown in FIG. 3. This avoids that the light anti-emission surface C of the light guide plate 3 is exposed to the inside of the upper casing 6, so that the light emitted from the LEDs 1 will not directly enter into the light anti-emission surface C of the light guide plate 3.

With this construction, all the light entering into the light guide plate 3 is introduced from the light incident surface A of the light guide plate 3. Therefore, as described above, the light entered into the light guide plate 3 repeats total reflection on the light emission surface B and the light anti-emission surface C of the light guide plate 3, and the propagation direction thereof is changed by the dot pattern printing or the like provided on the light anti-emission surface C, and then emitted from the light emission surface B.

Next, the construction and the optical path in the region near between the adjacent LEDs 1 as shown in FIG. 4 will be described below. The construction on the light emission surface B side of the light guide plate 3 as shown in FIG. 4 is the same as that near the LEDS 1 as shown in FIG. 3, and hence its description will be omitted herein. On the other hand, in the construction of the light anti-emission surface C side of the light guide plate 3 as shown in FIG. 4, a hole 10 extending from near the LED substrate 2 (the LEDs 1 side) to part of the light anti-emission surface C is formed in the reflecting sheet 5. Space 11 is formed between the lower casing 7 located near the LED substrate 2 and the lower surface of the reflecting sheet 5. A second reflecting sheet 12 is stuck to the portion of the lower casing 7 locating in the space 11. The reflecting sheet 5 is also provided in position to be parallel with the LED substrate 2.

The space 11 and the second reflecting sheet 12 are also provided in the construction near the LEDs 1 as shown in FIG. 3. In an alternative, neither the space 11 nor the second reflecting sheet 12 may be disposed near the LEDs 1 in the present invention.

Subsequently, the light reflected from the light incident surface A of the light guide plate 3 near the LEDs 1, and the light emitted in a direction perpendicular to a direction connecting the LEDs 1 and the light guide plate 3 are reflected from the reflecting sheet 5, the upper casing 6, and the light incident surface A of the light guide plate 3, and then reaches between the adjacent LEDs 1. The light so reached there passes through the hole 10 of the reflecting sheet 5, and is reflected from the reflecting sheet 12, and again passes through the hole 10 of the reflecting sheet 5 and enters into the light anti-emission surface C of the light guide plate 3. The light entered from the light anti-emission surface C is directly emitted from the light emission surface B of the light guide plate 3.

In a general surface light source device using the LEDs 1 as a light source, the region near the LEDs 1 is bright, and the region between the adjacent LEDs 1 is dark. For the reason for this, the surface light source of the first preferred embodiment has light introducing means for directly introducing the light emitted from the LEDs 1 into the light anti-emission surface C of the light guide plate 3, by disposing the hole 10 of the reflecting sheet 5 and the second reflecting sheet 12 near between the adjacent LEDs 1, as described above. By the presence of the light introducing means, the surface light source device of the first preferred embodiment is capable of increasing the luminance near between the adjacent LEDs 1, thereby suppressing non-uniform luminance between the region near the LED 1 and the region near between the adjacent LEDs 1.

That is, in the surface light source device of the first preferred embodiment, the hole 10 of the reflecting sheet 5 and the second reflecting sheet 12 spuriously create a high luminance region near between the adjacent LEDs 1. This inhibits only the luminance of the region near the LEDs 1 from being intensified, so that the luminance can be increased continuously to improve the uniformity of luminance distribution.

Figure 14:
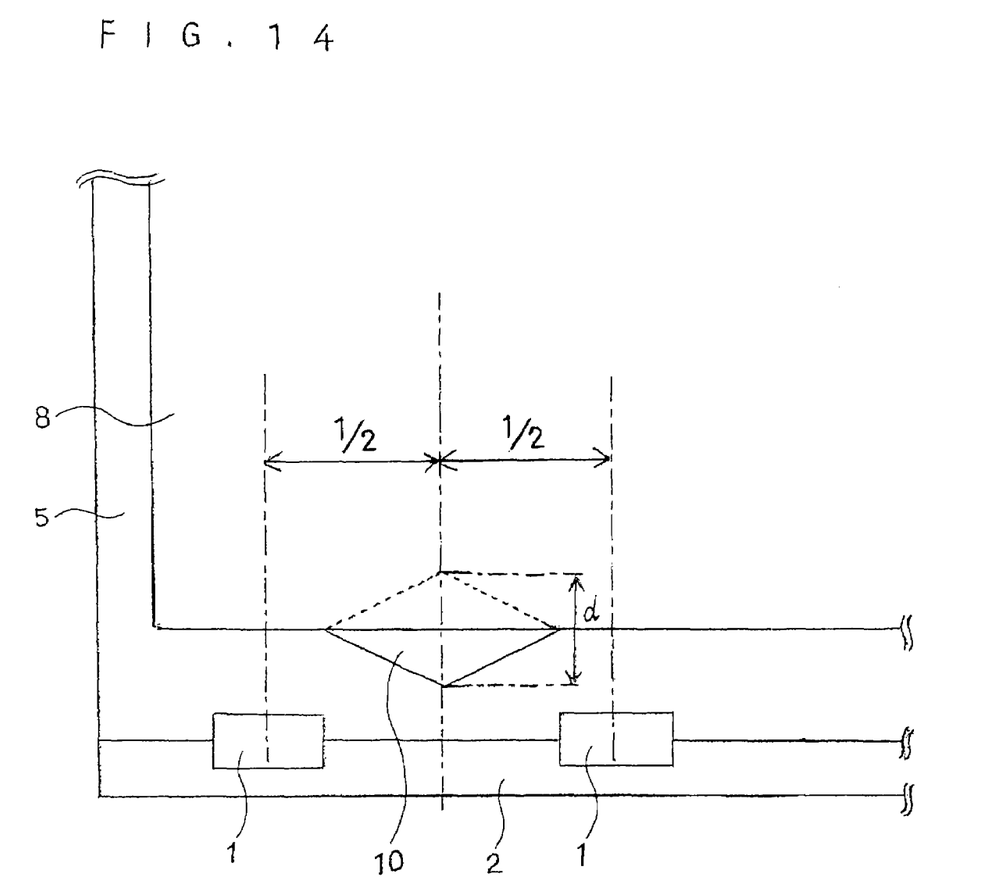
FIG. 14 shows a partial plan view of a corner of the surface light source device, depicting a hole of a reflective layer that is maximized at a mid-point between the point light sources.

The shape of the hole 10 formed in the reflecting sheet 5 is not limited to a circle or a square. A plurality of the holes 10 may be formed between the adjacent LEDs 1, respectively. Preferably, the cross-sectional distance of the hole 10 (the cross-sectional length in the direction from the LEDs 1 side to the light guide plate 3 side, namely a distance indicated by α in FIG. 4) is maximized at the mid-point between the adjacent LEDs 1, as shown in FIG. 14. When a plurality of the holes 10 are present in the direction from the LEDs 1 side to the light guide plate 3 side, the sum of the cross-sectional distances of the individual holes 10 is regarded as the cross-sectional distance of the holes 10 in the corresponding area.

Figure 15:
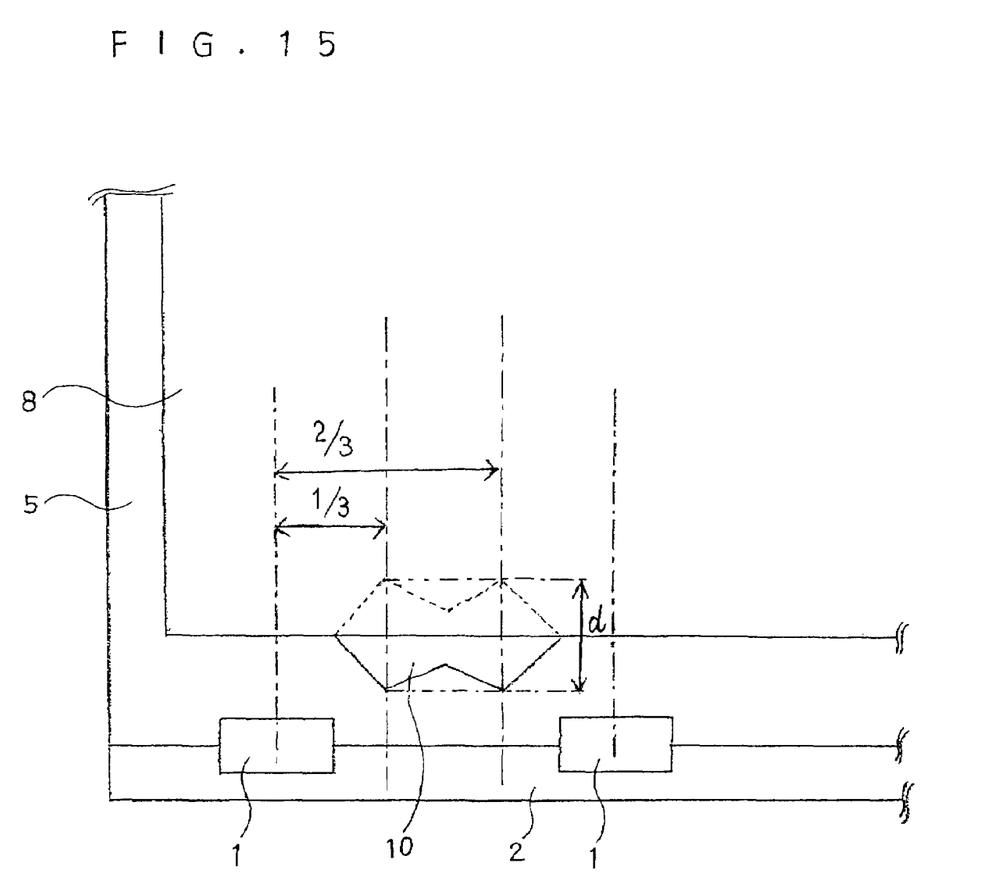
FIG. 15 shows a partial plan view of a corner of the surface light source device, depicting a hole of a reflective layer that is maximized at a position of one-third and at a position of two-thirds between the point light sources.

By arranging so as to maximize the cross-sectional distance of the hole 10 positioned at one third, and at two third of the region between the adjacent LEDs 1, it is possible to create two locations where the luminance is spuriously high in between the adjacent LEDs 1, enabling luminance uniformity to be further improved. This is shown in FIG. 15. In addition, by setting as long as possible the distance from the LEDs 1 to the light incident surface A of the light guide plate 3, the light emitted from the LEDs 1 can be further spread, so that still much light can reach between the adjacent LEDs 1.

By arranging so that the distance from the reflecting sheet 5 positioned in parallel with the LED substrate 2 to the light guide plate 3 is minimized at the mid-point between the adjacent LEDs 1, the amount of light entered from between the adjacent LEDs 1 into the light guide plate 3 can be increased thereby to improve the luminance uniformity. The luminance uniformity can also be improved by using LEDs exhibiting the maximum light distribution to a direction connecting the LEDs 1 and the light guide plate 3, and to a direction perpendicular to this direction.

In an alternative, a prism having a surface perpendicular to the light emission surface B may be formed on the light incident surface A of the light guide plate 3. By the presence of this prism, the light entered from near the LEDs 1 into the light guide plate 3 can be diffused in the shape of the prism, and spread to between the adjacent LEDs 1, enabling the luminance uniformity to be further improved.

Second Preferred Embodiment

Figure 5:
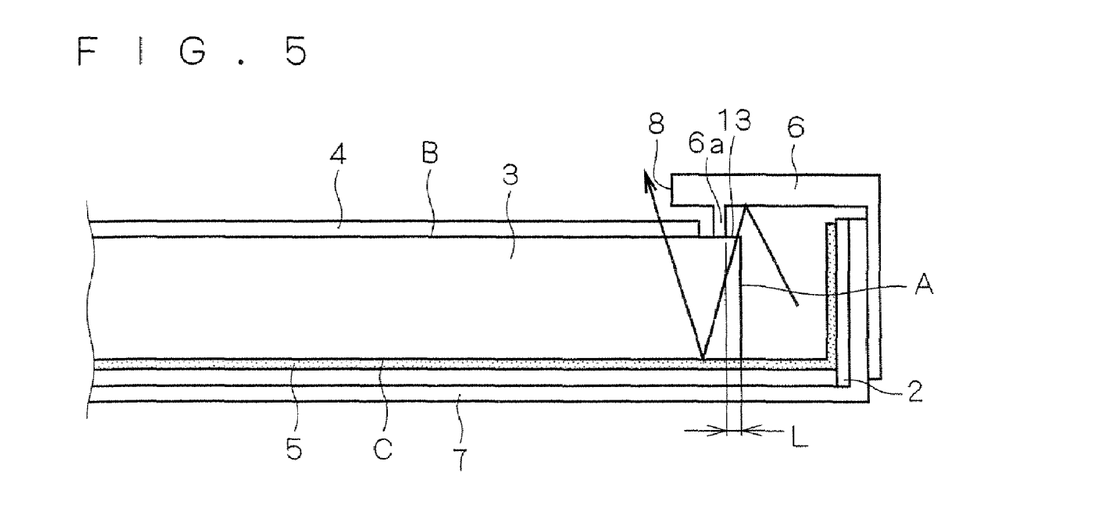
FIG. 5 is a cross section of a region near between adjacent LEDs in a surface light source device according to a second preferred embodiment of the present invention.

FIG. 5 is a cross section in a region near between the adjacent LEDs 1 in a surface light source device according to a second preferred embodiment of the present invention. On the other hand, the construction in a region near the LEDs 1 of the surface light source device of the second preferred embodiment is basically the same as that of the first preferred embodiment. That is, the cross sectional construction in the region near the LEDs 1 is identical to that described with respect to FIG. 3, except for the absence of the space 11 and the second reflecting sheet 12. Therefore, the detailed descriptions of the construction and the optical path in the region near the LEDs 1 of the second preferred embodiment will be left out of the following.

The construction and the optical path in the region near between the adjacent LEDs 1 in the second preferred embodiment will next be described with reference to FIG. 5. Unlike the region near the LEDs 1, a convex portion 6*a* of an upper casing 6 making a contact with a light emission surface B of a light guide plate 3 is reduced in its width in the direction of the cross section. As a result, part of the light emission surface B which is exposed without being covered with the convex portion 6*a* is present in the inside of the upper casing 6. That is, the second preferred embodiment has a region where the light emission surface B of the light guide plate 3 is exposed (an exposed part 13), in between the upper casing 6 holding the light guide plate 3 and the LEDs 1.

Accordingly, part of the light emitted from the LEDs 1 enters from the exposed part 13 of the light emission surface B. That is, the exposed part 13 functions as light introducing means for directly introducing the light into the light emission surface B. The light entered from the light emission surface B is emitted from the light anti-emission surface C of the light guide plate 3, and reflected from the reflecting sheet 5 and then reenters into the light guide plate 3. Part of the light reentered into the light guide plate 3 is directly emitted from the light emission surface B.

The second preferred embodiment spuriously creates a high luminance region by disposing the light introducing means for directly introducing light into the light emission surface B, in between the adjacent LEDs 1 arranged discretely. This inhibits only the luminance of the region near the LEDs 1 from being intensified, so that the luminance can be increased continuously near a light incident surface A of the light guide plate 3, thereby improving the uniformity of luminance distribution.

The uniformity of luminance distribution can be further improved by gradually changing a distance L so as to be the maximum at the mid-point between the adjacent LEDs 1, wherein the distance L is the distance from the light incident surface A of the light guide plate 3 to the convex portion 6*a* of the upper casing 6. Alternatively, the shape of the convex portion 6*a* may be changed so that the distance L is the maximum at a position of one third, and a position of two third in between the adjacent LEDs 1. This crates two spuriously high luminance regions per between the adjacent LEDs 1, enabling the luminance uniformity to be further improved.

In the second preferred embodiment, the convex portion 6*a* of the upper casing 6 controls the exposed part 13 of the light emission surface B. In an alternative, light introducing means for directly introducing light into the light emission surface B may be constructed in combination of the reflecting sheet 5 and the like, as in the first preferred embodiment. In the alternative, it is unnecessary to specially form the upper casing 6, and the light introducing means can be constructed with an inexpensive reflecting sheet alone.

Third Preferred Embodiment

Figure 6:
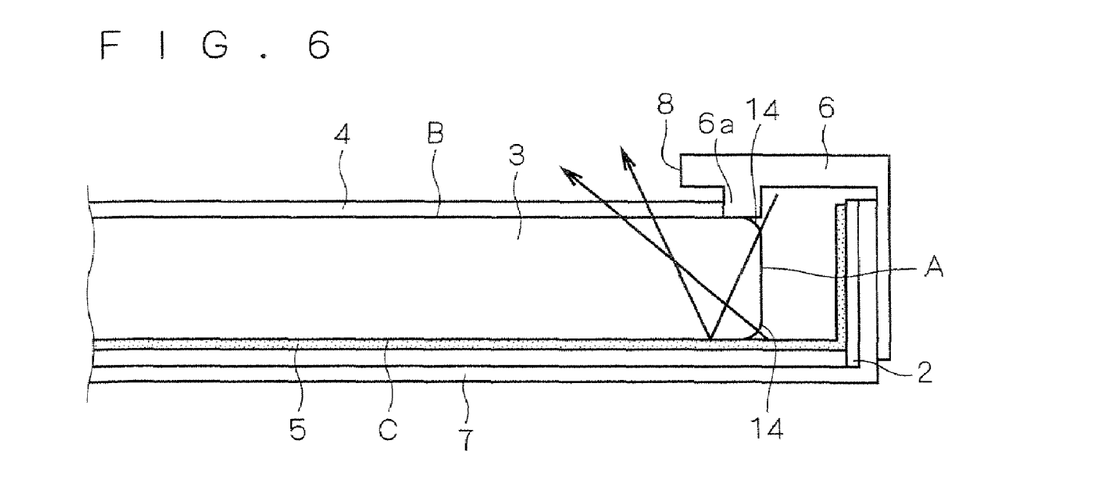
FIG. 6 is a cross section of a region near between adjacent LEDs of a surface light source device according to a third preferred embodiment of the present invention.

FIG. 6 is a cross section in a region near between adjacent LEDs 1 in a surface light source device according to a third preferred embodiment of the present invention. On the other hand, the construction in a region near the LEDs 1 of the surface light source device of the third preferred embodiment is basically the same as that of the first preferred embodiment. That is, the cross sectional construction in the region near the LEDs 1 is identical to that described with respect to FIG. 3, except for the absence of the space 11 and the second reflecting sheet 12. Therefore, the detailed descriptions of the construction and the optical path in the region near the LEDs 1 of the third preferred embodiment will be left out of the following.

The construction and the optical path near between the adjacent LEDs 1 in the third preferred embodiment will next be described with reference to FIG. 6. R-shaped portions 14 (portions shaped like a circular arc) are provided respectively at a corner formed by a light emission surface B and a light incident surface A of the light guide plate 3, and at a corner formed by a light anti-emission surface C and the light incident surface A of the light guide plate 3.

Therefore, part of the light emitted from the LEDs 1 enters from the R-shaped portion 14 formed on the light incident surface A near between the adjacent LEDs 1. The lights entered from the R-shaped portions 14 differ from the light directly entered from the light incident surface A in incident angle. That is, the angle to the light emission surface B and the angle to the light anti-emission surface C are acuter than the critical angle for propagating through the light guide plate 3. Hence, most of the lights entered from the R-shaped portions 14 are directly emitted from the light emission surface B near the light incident surface A.

Specifically, in the third preferred embodiment, light introducing means for forming an incident angle different from the incident angle of the light directly entering into the light incident surface A is provided on the light incident surface A of the light guide plate 3 located near between the adjacent LEDs 1. That is, the light introducing means of the third preferred embodiment has the R-shaped portions 14 respectively provided at the corner formed by the light emission surface B and the light incident surface A of the light guide plate 3, and at the corner formed by the light anti-emission surface C and the light incident surface A of the light guide plate 3.

Thus, the third preferred embodiment spuriously creates a high luminance region by disposing the R-shaped portions 14 in between the adjacent LEDs 1 arranged discretely. This inhibits only the luminance of the region near the LEDs 1 from being intensified, so that the luminance can be increased continuously near the light incident surface A, thereby improving the uniformity of luminance distribution.

In the third preferred embodiment, the R-shaped portions 14 are provided at the corner formed by the light emission surface B and the light incident surface A, and at the corner formed by the light anti-emission surface C and the light incident surface A. In an alternative, if the luminance uniformity can be improved sufficiently, the R-shaped portion 14 may be formed only at either one of the two corners. The radius of the R-shaped portion 14 can be increased gradually so as to be the maximum at the mid-point between the adjacent LEDs 1. Alternatively, the radius of the R-shaped portion 14 may be changed so as to be the maximum at a position of one third, and at a position of two third in between the adjacent LEDs 1. This creates two spuriously high luminance regions per between the adjacent LEDs 1, enabling the luminance uniformity to be further improved.

Fourth Preferred Embodiment

Figure 7:
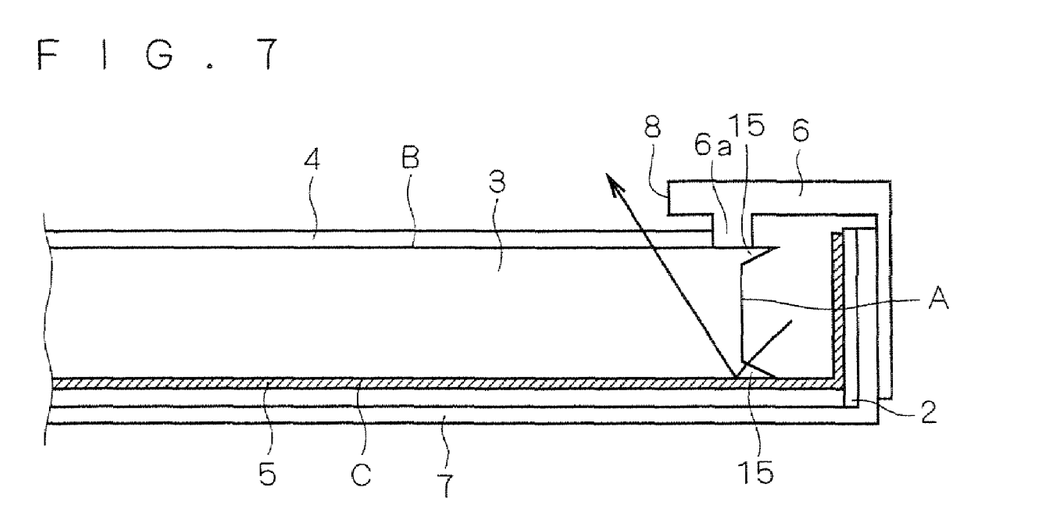
FIG. 7 is a cross section of a region near between adjacent LEDs of a surface light source device according to a fourth preferred embodiment of the present invention.

FIG. 7 is a cross section in a region near between adjacent LEDs 1 in a surface light source device according to a fourth preferred embodiment of the present invention. On the other hand, the construction in a region near the LEDs 1 of the surface light source device of the fourth preferred embodiment is basically the same as that of the first preferred embodiment. That is, the cross sectional construction in the region near the LEDs 1 is identical to that described with respect to FIG. 3, except for the absence of the space 11 and the second reflecting sheet 12. Therefore, the detailed descriptions of the construction and the optical path in the region near the LEDs 1 of the fourth preferred embodiment will be left out of the following.

The construction and the optical path in a region near between the adjacent LEDs 1 in the fourth preferred embodiment will next be described with reference to FIG. 7. Projections 15 extending in a direction from the light guide plate 3 to the LED substrate 2 are provided respectively on a side formed by a light emission surface B and a light incident surface A of the light guide plate 3, and on a side formed by a light anti-emission surface C and the light incident surface A.

Therefore, part of the light emitted from the LEDs 1 enters from the projections 15 formed on the light incident surface A near between the adjacent LEDs 1, into the light guide plate 3. The lights entered from the projections 15 differ from the light directly entered from the light incident surface A in incident angle. That is, the angle to the light emission surface B and the angle to the light anti-emission surface C are acuter than the critical angle for propagating through the light guide plate 3. Hence, most of the lights entered from the projections 15 are directly emitted from the light emission surface B near the light incident surface A.

Specifically, in the fourth preferred embodiment, light introducing means for forming an incident angle different from the incident angle of the light directly entering into the light incident surface A is provided on the light incident surface A of the light guide plate 3 located near between the adjacent LEDs 1. That is, the light introducing means of the fourth preferred embodiment has the projections 15 respectively provided on the side formed by the light emission surface B and the light incident surface A of the light guide plate 3, and on the side formed by the light anti-emission surface C and the light incident surface A.

Thus, the fourth preferred embodiment spuriously creates a high luminance region by disposing the projections 15 in between the adjacent LEDs 1 arranged discretely. This inhibits only the luminance of the region near the LEDs 1 from being intensified, so that the luminance can be increased continuously near the light incident surface A of the light guide plate 3, thereby improving the uniformity of luminance distribution. The metal mold of the projections 15 of the fourth preferred embodiment is simpler than that of the R-shaped portions 14 of the third preferred embodiment, allowing for a reduction in the cost of the metal mold.

In the fourth preferred embodiment, the projections are provided on the side formed by the light emission surface B and the light incident surface A of the light guide plate 3, and on the side formed by the light anti-emission surface C and the light incident surface A. In an alternative, if the luminance uniformity can be improved sufficiently, the projections 15 may be formed only on either one of the two sides. In consideration of the luminance uniformity, an optimum shape of the projections 15 is selected.

Fifth Preferred Embodiment

Figure 8:
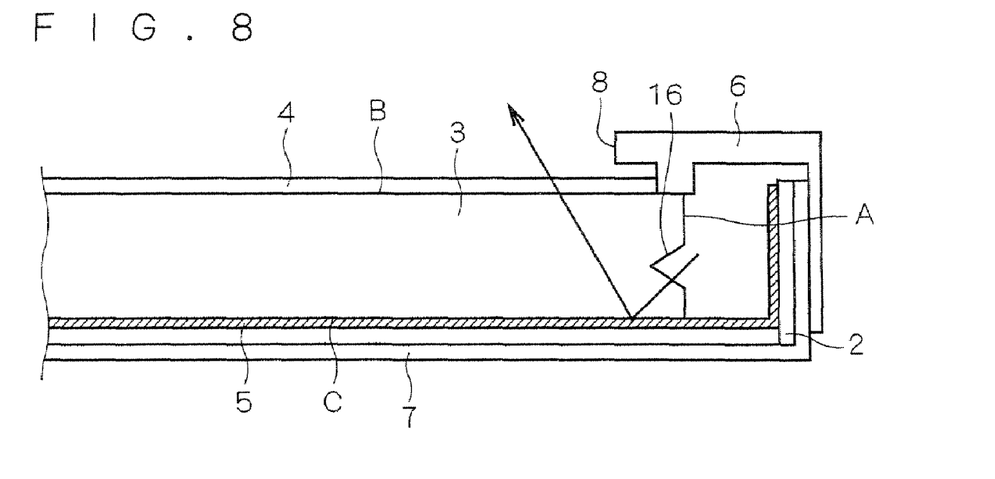
FIG. 8 is a cross section of a region near between adjacent LEDs of a surface light source device according to a fifth preferred embodiment of the present invention.
Figure 9:
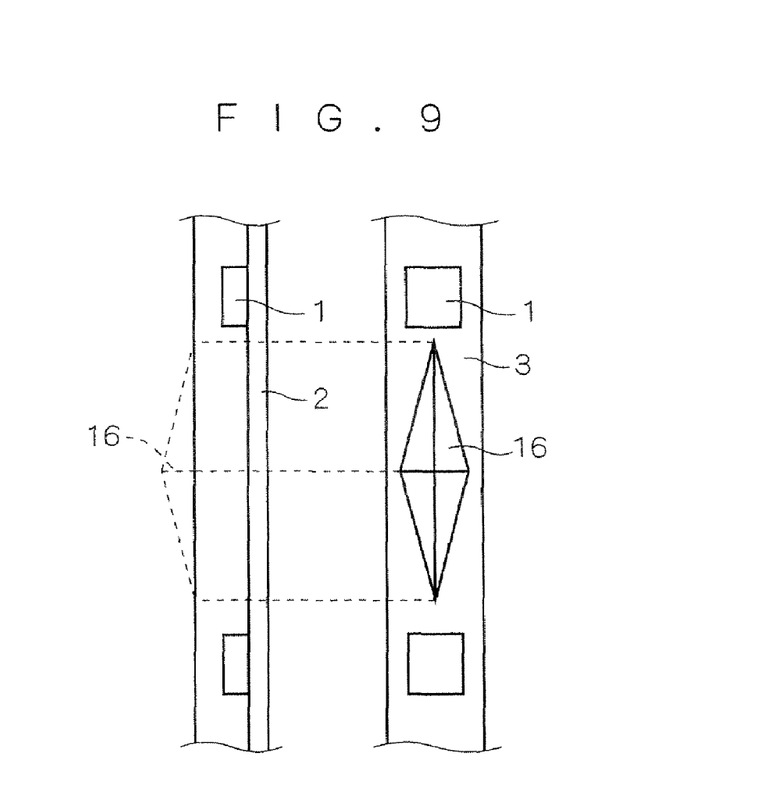
FIG. 9 shows a front view and a side view of a light guide plate of the surface light source device in the fifth preferred embodiment.

FIG. 8 is a cross section in a region near between adjacent LEDs 1 in a surface light source device according to a fifth preferred embodiment of the present invention. FIG. 9 shows a front view and a side view of a light guide plate 3 in a region near between the adjacent LEDs 1 of a surface light source device in the fifth preferred embodiment.

On the other hand, the construction in a region near the LEDs 1 of the surface light source device of the fifth preferred embodiment is basically the same as that of the first preferred embodiment. That is, the cross sectional construction in the region near the LEDs 1 is identical to that described with respect to FIG. 3, except for the absence of the space 11 and the second reflecting sheet 12. Therefore, the detailed descriptions of the construction and the optical path near the LEDs 1 of the fifth preferred embodiment will be left out of the following.

The construction and the optical path in a region near between the adjacent LEDs 1 in the fifth preferred embodiment will next be described with reference to FIGS. 8 and 9. A V-shaped groove 16 is formed in a light incident surface A of the light guide plate 3. As shown in FIG. 9, the V-shaped groove 16 has the maximum width at the mid-point between the adjacent LEDs 1. When the V-shaped groove 16 is viewed from the front of the light guide plate 3, it is rhomboid.

Therefore, part of the light emitted from the LEDs 1 enters from the V-shaped groove 16 in the light incident surface A, into the light guide plate 3. The light entered from the V-shaped groove 16 differs from the light directly entered from the light incident surface A in incident angle. That is, the angle to the light emission surface B and the angle to the light anti-emission surface C are acuter than the critical angle for propagating through the light guide plate 3. Hence, most of the lights entered from the V-shaped groove 16 are directly emitted from the light emission surface B near the light incident surface A.

Specifically, in the fifth preferred embodiment, light introducing means for forming an incident angle different from the incident angle of the light directly entering into the light incident surface A is provided in the light incident surface A located near between the adjacent LEDs 1. That is, the light introducing means of the fifth preferred embodiment is the V-shaped groove 16 disposed in the light incident surface A of the light guide plate 3.

Thus, the fifth preferred embodiment spuriously creates a high luminance region by disposing the V-shaped groove 16 in the light incident surface A, in between the adjacent LEDs 1 arranged discretely. This inhibits only the luminance of the region near the LEDs 1 from being intensified, so that the luminance can be increased continuously near the light incident surface A, thereby improving the uniformity of luminance distribution.

The luminance near between the adjacent LEDs 1 can be considerably improved by adjusting the depth, the width, and the angle of the V-shaped groove 16, and the shape of a vex, and the like. The metal mold for forming the V-shaped groove 16 can be simplified, permitting a reduction in the cost of the metal mold.

In the fifth preferred embodiment, the single V-shaped groove 16 is formed in the light incident surface A at the mid-point between the adjacent LEDs 1. In an alternative, a plurality of V-shaped grooves 16 may be formed. Further, a plurality of V-shaped grooves 16 may be formed in different widths, angles, and depths. The position of the V-shaped groove 16 can be determined arbitrarily in view of the luminance uniformity of the light emission surface B.

<Modification 1>

Figure 10:
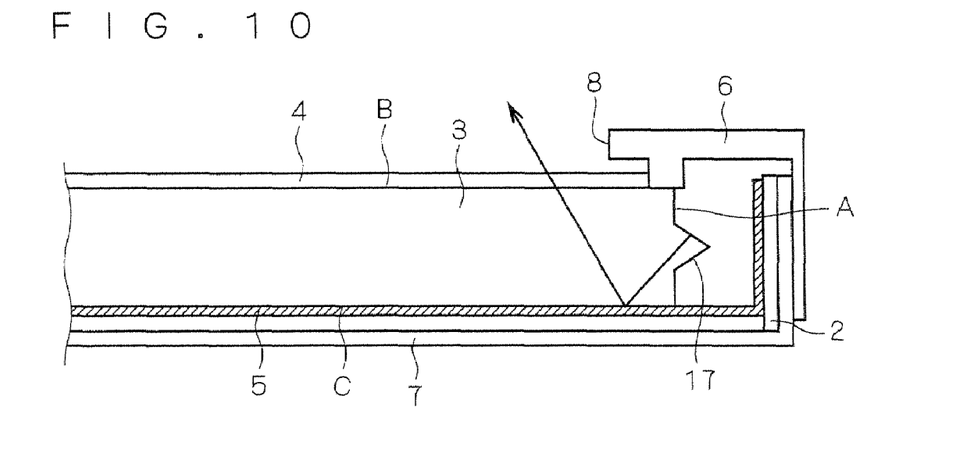
FIG. 10 is a cross section of a region near between adjacent LEDs of a surface light source device according to a modification 1 of the fifth preferred embodiment.
Figure 11:
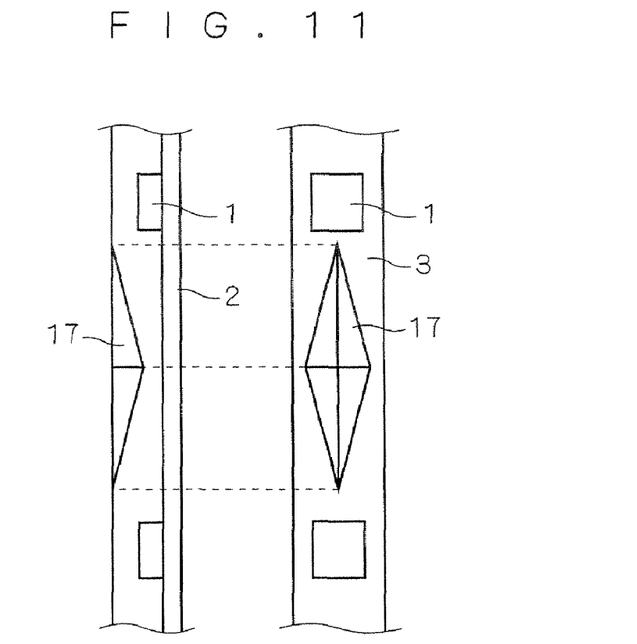
FIG. 11 shows a front view and a side view of a light guide plate of the surface light source device in the modification 1 of the fifth preferred embodiment.

FIG. 10 is a cross section in a region near between adjacent LEDs 1 of a surface light source device according to a modification 1 of the fifth preferred embodiment. FIG. 11 shows a front view and a side view of a light guide plate 3 in a region near between adjacent LEDs 1 of the surface light source device in the modification 1. The construction in a region near the LEDs 1 of the surface light source device of the modification 1 is also basically the same as that of the first preferred embodiment.

In the modification 1, a V-shaped convex portion 17 is formed on a light incident surface A of the light guide plate 3. As shown in FIG. 11, the V-shaped convex portion 17 has the maximum depth and the maximum width at the mid-point between the adjacent LEDs 1. When the V-shaped convex portion 17 is viewed from the front of the light guide plate 3, it is rhomboid.

Thus, the modification 1 spuriously creates a high luminance region by disposing the V-shaped convex portion 17 on the light incident surface A, in between the adjacent LEDs 1 arranged discretely. Like the fifth preferred embodiment, the modification 1 also inhibits only the luminance of the region near the LEDs 1 from being intensified, so that the luminance can be increased continuously near the light incident surface A of the light guide plate 3, thereby improving the uniformity of luminance distribution.

<Modification 2>

Figure 12:
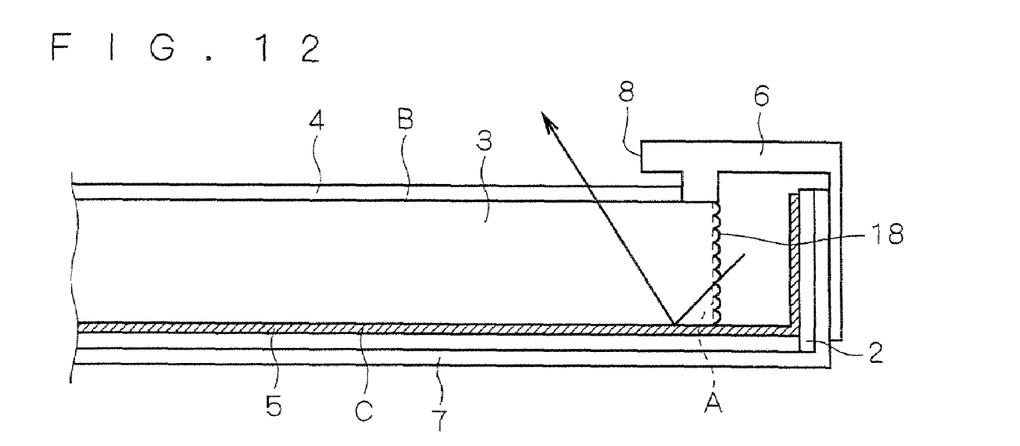
FIG. 12 is a cross section of a region between adjacent LEDs of a surface light source device according to a modification 2 of the fifth preferred embodiment.

FIG. 12 is a cross section in a region near between adjacent LEDs 1 of a surface light source device according to a modification 2 of the fifth preferred embodiment. FIG. 12 shows a front view and a side view of a light guide plate 3 in a region near between adjacent LEDs 1 of the surface light source device in the modification 2. The construction in a region near the LEDs 1 of the surface light source device of the modification 2 is also basically the same as that of the first preferred embodiment.

In the modification 2, a satin shape (a crimp shape) 18 is formed in a light incident surface A of the light guide plate 3.

Figure 13:
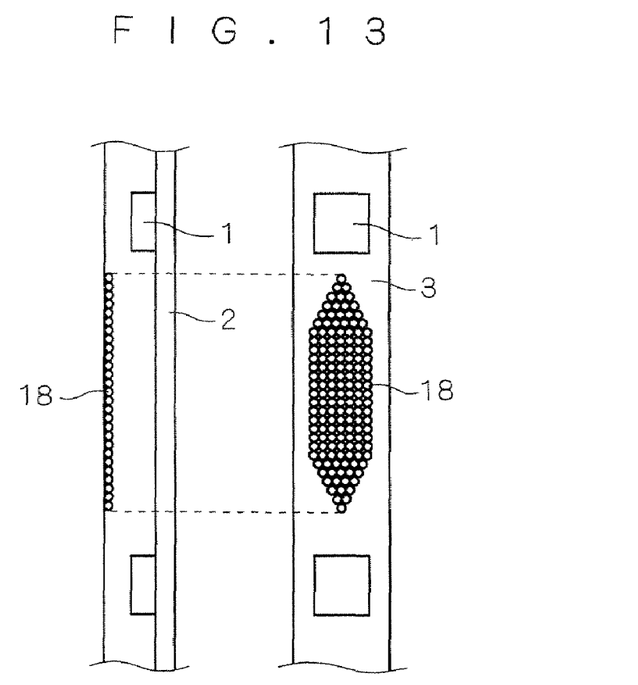
FIG. 13 shows a front view and a side view of a light guide plate of the surface light source device in the modification 2 of the fifth preferred embodiment.

As shown in FIG. 13, the satin shape 18 has the maximum area at the mid-point between the adjacent LEDs 1. When the satin shape 18 is viewed from the front of the light guide plate 3, it takes such a shape of adding triangles to two rectangular sides, respectively. For example, the satin shape 18 can be obtained by sandblasting the light incident surface A.

In the modification 2, part of the light emitted from the LEDs 1 enters from the surface of the satin shape 18 other than the light incident surface A perpendicular to the light emission surface B and to the light anti-emission surface C, into the light guide plate 3. Therefore, the light entered from the satin shape 18 differs from the light directly entered from the light incident surface A in incident angle. That is, the angle to the light emission surface B, and the angle to the light anti-emission surface C are acuter than the critical angle for propagating through the light guide plate 3. Hence, most of the lights entered from the satin shape 18 are directly emitted from the light emission surface B near the light incident surface A.

Thus, the modification 2 spuriously creates a high luminance region by disposing the satin shape 18 on the light incident surface A, in between the adjacent LEDs 1 arranged discretely. Like the fifth preferred embodiment, the modification 2 also inhibits only the luminance of the region near the LEDs 1 from being intensified, so that the luminance can be increased continuously near the light incident surface A of the light guide plate 3, thereby improving the uniformity of luminance distribution. Further, the modification 2 enables fine luminance adjustment in between the adjacent LEDs 1, allowing for a further improvement in the display quality on the light emission surface B.

Additional effects can be expected by individually combining the various shapes and the like as described in the first to fifth preferred embodiments.

It should be noted that the point light sources used in the present invention is not limited to the LEDs 1. Needless to say, a light source generating white light by mixing red, green, and blue is applicable to the respective preferred embodiments. In these cases, the occurrences of luminance non-uniformity and color non-uniformity can be suppressed so that the respective colors' luminance can be equated at the light emission surface B of the light guide plate 3, thus leading to uniform white light.

While the invention has been shown and described in detail, the foregoing description is in all aspects illustrative and not restrictive. It is therefore understood that numerous modifications and variations can be devised without departing from the scope of the invention.

What is claimed is:

1. A surface light source device comprising:
   a plurality of point light sources arranged at a predetermined spacing;
   a light guide plate having upper and lower surfaces and side surfaces, one of the side surfaces of the light guide plate serving as a light incident surface by which light emitted from the plurality of light sources reaches the upper surface to generate a surface light;
   a first reflective layer arranged at the lower surface of the light guide plate and near the point light sources;
   a casing that has an opening part at a position corresponding to the upper surface of the light guide plate, and that holds the point light sources and the light guide plate and the first reflective layer; and
   light introducing means for introducing the light emitted from the point light sources into the upper surface or the lower surface of the light guide plate, the light introducing means being disposed between the point light sources adjacent to each other, wherein the light introducing means has a second reflective layer arranged underneath the lower surface of the light guide plate below a space arranged above a horizontal extension portion of the first reflective layer that extends away from the light guide plate; and the first reflective layer includes a plurality of holes above the second reflective layer.

2. The surface light source device according to claim 1 wherein, the plurality of holes are present between the point light sources adjacent to each other.

3. The surface light source device according to claim 1 wherein, the hole of the first reflective layer is maximized at a mid-point between the point light sources adjacent to each other, in cross-sectional length in a direction from the point light sources side to the light guide plate side.

4. The surface light source device according to claim 2 wherein, the hole of the first reflective layer is maximized at a mid-point between the point light sources adjacent to each other, in cross-sectional length in a direction from the point light sources side to the light guide plate side.

5. The surface light source device according to claim 1 wherein, the hole of the first reflective layer is maximized at a position of one third and at a position of two third in between the point light sources adjacent to each other, in cross-sectional length in a direction from the point light sources side to the light guide plate side.

6. The surface light source device according to claim 2 wherein, the hole of the first reflective layer is maximized at a position of one third and at a position of two third in between the point light sources adjacent to each other, in cross-sectional length in a direction from the point light source side to the light guide plate side.

7. A surface light source device comprising:

a plurality of point light sources arranged at a predetermined spacing;

a light guide plate having upper and lower surfaces and side surfaces, one of the side surfaces of the light guide plate serving as a light incident surface by which light emitted from the plurality of light sources reaches the upper surface to generate a surface light;

a first reflective layer arranged at the lower surface of the light guide plate and near the point light sources;

a casing that has an opening part at a position corresponding to the upper surface of the light guide plate, and that holds the point light sources and the light guide plate and the first reflective layer; and light introducing means for introducing the light emitted from the point light sources into the upper surface or the lower surface of the light guide plate, the light introducing means being disposed between the point light sources adjacent to each other, wherein the light introducing means has a light incident part for introducing light from the point light sources into the upper surface of the light guide plate, the light incident part located above a space between the light incident surface and the point light sources.

8. A display device comprising:

(i) a surface light source device comprising:

(a) a plurality of point light sources arranged at a predetermined spacing;

(b) a light guide plate having upper and lower surfaces and side surfaces, one of the side surfaces of the light guide plate serving as a light incident surface by which light emitted from the plurality of light sources reaches the upper surface to generate a surface light;

(c) a first reflective layer arranged at the lower surface of the light guide plate and near the point light sources;

(d) a casing that has an opening part at a position corresponding to the light emission surface of the light guide plate, and that holds the point light sources and the light guide plate and the first reflective layer; and (e) light introducing means for introducing light emitted from the point light source into the upper surface or the light lower surface of the light guide plate, the light introducing means being disposed between the point light sources adjacent to each other; and (ii) a display part displaying image with light emitted from the opening part, disposed on the opening part of the surface light source device, wherein the light introducing means has a second reflective layer arranged underneath the lower surface of the light guide plate below a space arranged above a horizontal extension portion of the first reflective layer that extends away from the light guide plate; and the first reflective layer includes a plurality of holes above the second reflective layer.

9. A surface light source device comprising:

a plurality of light sources arranged in a row at predetermined distances and configured to emit light;

a light guide plate having upper and lower surfaces and side surfaces, one of the side surfaces of the light guide plate serving as a light incident surface by which light emitted from the plurality of light sources reaches the upper surface to generate a surface light;

a first reflective layer arranged at the lower surface of the light guide plate, the first reflective layer having a horizontal extension portion extending away from the light guide plate, the light incident surface of the light guide plate and the plurality of light sources separated by a space arranged above the horizontal extension portion of the first reflective layer;

a casing configured to attach the plurality of light sources, the light guide plate, and the first reflective layer, the casing including an opening arranged above the upper surface of the light guide plate to emit the surface light; and a second reflective layer arranged either underneath the lower surface of the light guide plate below the space, or above the upper surface of the light guide plate above the space, and configured to reflect light emitted from the plurality of light sources towards the lower surface or the upper surface of the light guide plate, respectively.

10. The surface light source device according to claim 9, wherein the first reflective layer includes:

a plurality of holes above the second reflective layer.

11. The surface light source device according to claim 10, wherein the holes of the first reflective layer are arranged under the lower surface of the light guide plate at an edge of the light incident surface and are extending horizontally underneath the space.

12. The surface light source device according to claim 10, wherein the holes are arranged along a direction in parallel with the light incident surface at mid-positions between adjacent light sources of the plurality of light sources.

13. The surface light source device according to claim 9, further comprising:

a reflector arranged above the space, configured to reflect light emitted from the plurality of light sources onto a portion of the upper surface of the light guide plate.

14. The surface light source device according to claim 9, wherein a first edge formed between the upper surface of the light guide plate and the light incident surface, and a second edge formed between the lower surface of the light guide plate and the light incident surface are curved.

15. The surface light source device according to claim 9, wherein the light incident surface of the light guide plate has a projection projecting into the space along at least one of a first edge formed between the upper surface of the light guide plate and the light incident surface, and a second edge formed between the lower surface of the light guide plate and the light incident surface.

16. The surface light source device according to claim 9, wherein the light incident surface of the light guide plate has a plurality of v-shaped grooves arranged at a location between adjacent light sources of the plurality of light sources.

17. The surface light source device according to claim 9, wherein the light incident surface of the light guide plate has a plurality of v-shaped projections arranged at a location between adjacent light sources of the plurality of light sources.

18. The surface light source device according to claim 9, wherein the light incident surface of the light guide plate has a plurality of convexes and concaves that are arranged at a location between adjacent light sources of the plurality of light sources.

19. The surface light source device according to claim 9, wherein the plurality of light sources are made of light emitting diodes.

20. The surface light source device according to claim 9, wherein the first reflective layer further has a vertical extension portion vertically extending from the horizontal extension portion, the vertical extension portion including a plurality of recesses to accommodate the plurality of light sources.

21. The surface light source device according to claim 10, wherein a cross-sectional length of the plurality of holes in a direction from the plurality of light sources to the light incident surface is maximal at mid-positions between adjacent light sources of the plurality of light sources.

22. A display device comprising:
a surface light source device according to claim 9; and
a display unit configured to display an image with the surface light emitted from the opening of the surface light source device, the display unit arranged above the opening of the surface light source device.

* * * * *